US012500030B2

(12) United States Patent
Eda et al.

(10) Patent No.: US 12,500,030 B2

(45) Date of Patent: Dec. 16, 2025

(54) ELECTRONIC COMPONENT

(71) Applicant: TDK CORPORATION, Tokyo (JP)

(72) Inventors: Hokuto Eda, Tokyo (JP); Hitoshi Ohkubo, Tokyo (JP); Masazumi Arata, Tokyo (JP); Masataro Saito, Tokyo (JP); Kohei Takahashi, Yokohama (JP); Takamasa Iwasaki, Tokyo (JP); Manabu Ohta, Tokyo (JP); Kenei Onuma, Tokyo (JP)

(73) Assignee: TDK CORPORATION, Tokyo (JP)

( * ) Notice: Subject to any disclaimer, the term of this patent is extended or adjusted under 35 U.S.C. 154(b) by 811 days.

(21) Appl. No.: 17/845,003

(22) Filed: Jun. 21, 2022

(65) Prior Publication Data

US 2022/0415566 A1 Dec. 29, 2022

(30) Foreign Application Priority Data

Jun. 23, 2021 (JP) ................................ 2021-104171

(51) Int. Cl.

*H01F 27/29* (2006.01)

*H01F 27/255* (2006.01)

(52) U.S. Cl.

CPC ......... *H01F 27/292* (2013.01); *H01F 27/255* (2013.01)

(58) Field of Classification Search

CPC ................ H01F 27/292; H01F 27/255; H01F 2027/2809; H01F 5/04; H01F 5/00

USPC ........................................ 336/192, 198, 200

See application file for complete search history.

(56) References Cited

U.S. PATENT DOCUMENTS

| | | | | |
|---|---|---|---|---|
| 2003/0030994 | A1* | 2/2003 | Takaya | H01F 17/0006 361/728 |
| 2011/0007439 | A1* | 1/2011 | Asakawa | H03H 7/0107 361/111 |
| 2013/0020914 | A1* | 1/2013 | Tsukida | H01C 7/18 336/200 |
| 2016/0164483 | A1 | 6/2016 | Park et al. | |
| 2016/0233029 | A1* | 8/2016 | Oh | H01G 4/232 |
| 2016/0268044 | A1* | 9/2016 | Gu | H01G 4/12 |
| 2019/0244749 | A1* | 8/2019 | Adachi | H01F 27/292 |
| 2021/0166858 | A1 | 6/2021 | Saito et al. | |

FOREIGN PATENT DOCUMENTS

| | | | |
|---|---|---|---|
| JP | 2003-100548 | A | 4/2003 |
| JP | 2010-258743 | A | 11/2010 |
| JP | 2016-111349 | A | 6/2016 |
| JP | 2021-089936 | A | 6/2021 |

* cited by examiner

*Primary Examiner* — Shawki S Ismail

*Assistant Examiner* — Kazi S Hossain

(74) *Attorney, Agent, or Firm* — Oliff PLC

(57) ABSTRACT

An electronic component preventing peeling of an external terminal is provided. Since each of the external terminal electrodes on the upper face has a U-shaped outline, stress concentration is less likely to occur at an inner end portion than in the external terminal electrode having a corner at the inner end portion. Therefore, for example, even when an impact is applied, a situation in which the external terminal electrode peels off from the upper face due to stress concentration is prevented.

7 Claims, 9 Drawing Sheets

ELECTRONIC COMPONENT

CROSS-REFERENCE TO RELATED APPLICATIONS

This application is based upon and claims the benefit of priority from Japanese Patent Application No. 2021-104171 (Patent Document 1), filed on 23 Jun. 2021, the entire contents of which are incorporated herein by reference.

TECHNICAL FIELD

The present disclosure relates to an electronic component.

BACKGROUND

Well known in the art is an electronic component having an external terminal provided on a mounting face facing a mounting substrate. Japanese Patent Application Laid-Open No. 2016-111349 discloses an electronic component having four external terminals provided at four corners of a mounting face.

SUMMARY

In the above electronic component, when the external terminal is peeled off from the mounting face, the element characteristics may be deteriorated or the electronic component may cause a malfunction.

The inventors have made extensive studies on peeling of the external terminal, and have newly found a technique capable of effectively preventing a situation in which the external terminal is peeled off from a mounting face.

According to the present disclosure, an electronic component preventing peeling of an external terminal.

An electronic component according to one aspect of the present disclosure includes an element body having a pair of end faces parallel to each other and a mounting face connecting the pair of end faces, a first external terminal covering at least a mounting face of face of the element body and connecting electrically to an internal conductor provided in the element body, wherein when viewed from the mounting face side, the first external terminal extends inward from an edge corresponding to the end face, and has a U-shaped outline with an inner end portion curved.

In the electronic component, since the external terminal on the mounting face has a U-shaped outline, stress concentration is less likely to occur at the inner end portion of the external terminal. Therefore, for example, even when an impact is applied to the electronic component, a situation in which the external terminal peels off from the mounting face due to stress concentration is prevented.

In the electronic component according to another aspect of the present disclosure, wherein the first external terminal continuously covers the mounting face and the end face of the element body.

In the electronic component according to another aspect of the present disclosure comprising a pair of the first external terminals extending inward from the edge corresponding to the end face, wherein the inner end portion of each of the pair of first external terminals has a first curved portion on a side close to each other and a second curved portion on a side far from each other, and a curvature of the first curved portion is smaller than a curvature of the second curved portion.

In the electronic component according to another aspect of the present disclosure, wherein, in the outline of the pair of first external terminals, a length of a straight line extending from the edge corresponding to the end face to the first curved portion is shorter than a length of a straight line extending from the edge corresponding to the end face to the second curved portion.

In the electronic component according to another aspect of the present disclosure comprising the pair of first external terminals extending inward from one of the pair of end faces and a pair of second external terminals extending inward from the other of the pair of end faces, wherein the inner end portion of each of the pair of second external terminals has a first curved portion on a side close to each other and a second curved portion on a side far from each other, and a curvature of the first curved portion is smaller than a curvature of the second curved portion.

In the electronic component according to another aspect of the present disclosure, wherein the mounting face of the element body has a rectangular shape, and wherein the pair of first external terminals and the pair of second external terminals are respectively located at four corners of the mounting face.

In the electronic component according to another aspect of the present disclosure, wherein the element body includes metal powder and resin.

In the electronic component according to another aspect of the present disclosure, the element body has a pair of side faces orthogonal to the pair of end faces, and wherein an exposed region is formed between an outer edge of the mounting face and the first external terminal in a direction facing the pair of side faces on the mounting face, the mounting face is exposed from the first external terminal the exposed region.

DETAILED DESCRIPTION

Figure 1:
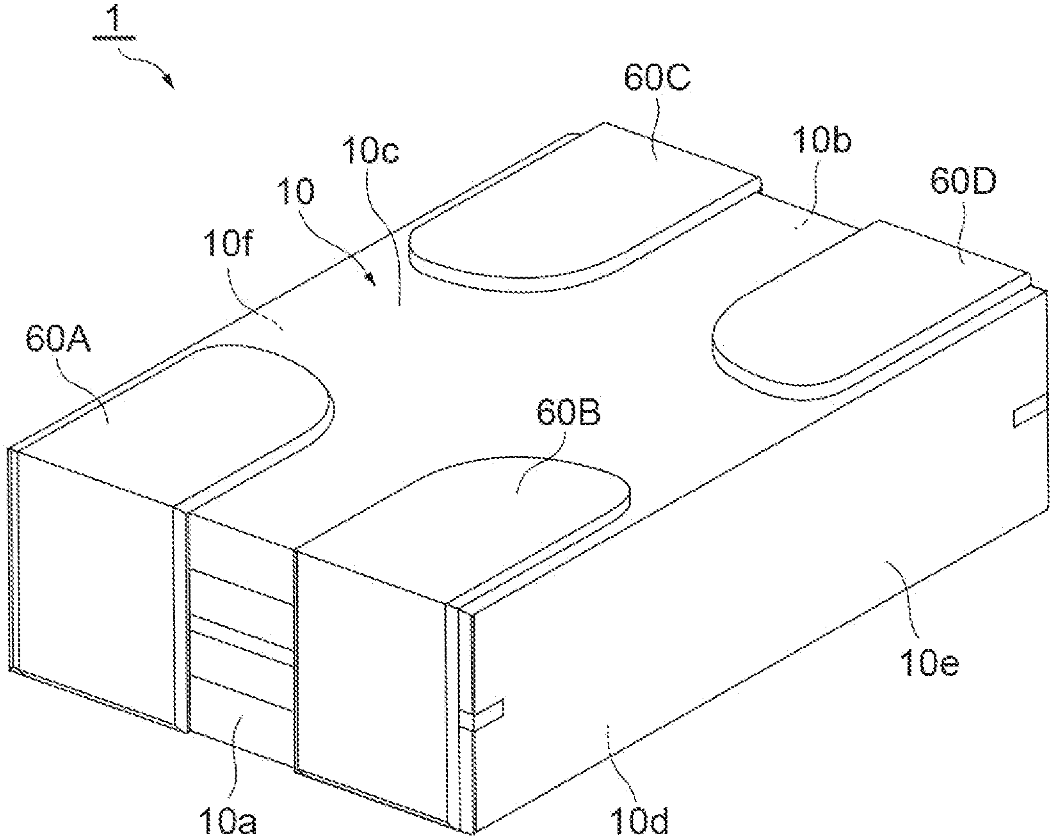
FIG. 1 is a schematic perspective view of the coil component according to one embodiment.

Hereinafter, embodiments of the present disclosure will be described in detail with reference to the accompanying drawings. In the description, the same reference numerals are used for the same elements or elements having the same functions, and redundant description will be omitted.

An electronic component according to one embodiment described below is one type of electronic component, and is a coil component including a coil portion as an internal conductor. The coil component 1 according to the embodiment is a balun coil. The balun coil is used, for example, when a near field communication circuit (NFC circuit) is mounted on a cellular terminal, for example. The balun coil performs conversion between an unbalanced signal of the antenna and a balanced signal of the NFC circuit, thereby realizing connection between the unbalanced circuit and the balanced circuit.

As shown in FIG. 1, the coil component 1 includes an element body 10, a coil structure 20 embedded in the element body 10, and two pairs of external terminal electrodes 60A, 60B, 60C, and 60D provided on the element body 10.

The element body 10 has a rectangular parallelepiped outer shape and has six faces 10*a* to 10*f*. As an example, the element body 10 is designed to have dimensions of long side 2.0 mm, short side 1.25 mm, and height 0.65 mm Among the faces 10*a* to 10*f* of the element body 10, the end face 10*a* and the end face 10*b* are parallel to each other, the upper face 10*c* and the lower face 10*d* are parallel to each other, and the side face 10*e* and the side face 10*f* are parallel to each other. The upper face 10*c* of the element body 10 is a mounting face of the element body 10 facing the mounting substrate side on which the coil component 1 is mounted, and connects the pair of end faces 10*a* and 10*b*.

The element body 10 is made of a metal magnetic powder-containing resin 12 which is one type of magnetic material. The metal magnetic powder-containing resin 12 is a bound powder in which metal powder (more specifically, metal magnetic powder) is bound by a binder resin. The metal magnetic powder of the metal magnetic powder-containing resin 12 is composed of, for example, an iron-nickel alloy (permalloy alloy), carbonyl iron, an amorphous, FeSiCr alloy in amorphous or crystalline state, sendust, or the like. The binder resin is, for example, a thermosetting epoxy resin. In the present embodiment, the content of the metal magnetic powder in the binder powder is 80 to 92 vol % in terms of volume percent, and 95 to 99 wt % in terms of weight percent. From the viewpoint of magnetic properties, the content of the metal magnetic powder in the binder powder may be 85 to 92 vol % in terms of volume percent and 97 to 99 wt % in terms of weight percent. The metal magnetic powder of the metal magnetic powder-containing resin 12 may be a powder having one type of average particle diameter or may be a mixed powder having a plurality of types of average particle diameters.

The metal magnetic powder-containing resin 12 of the element body 10 integrally covers a coil structure 20 described later. Specifically, the metal magnetic powder-containing resin 12 covers the coil structure 20 from above and below and covers the outer periphery of the coil structure 20. The metal magnetic powder-containing resin 12 fills the inner peripheral region of the coil structure 20.

The coil structure 20 includes an insulating substrate 30, an upper coil structure 40A provided on an upper side of the insulating substrate 30, and a lower coil structure 40B provided on a lower side of the insulating substrate 30.

Figure 3:
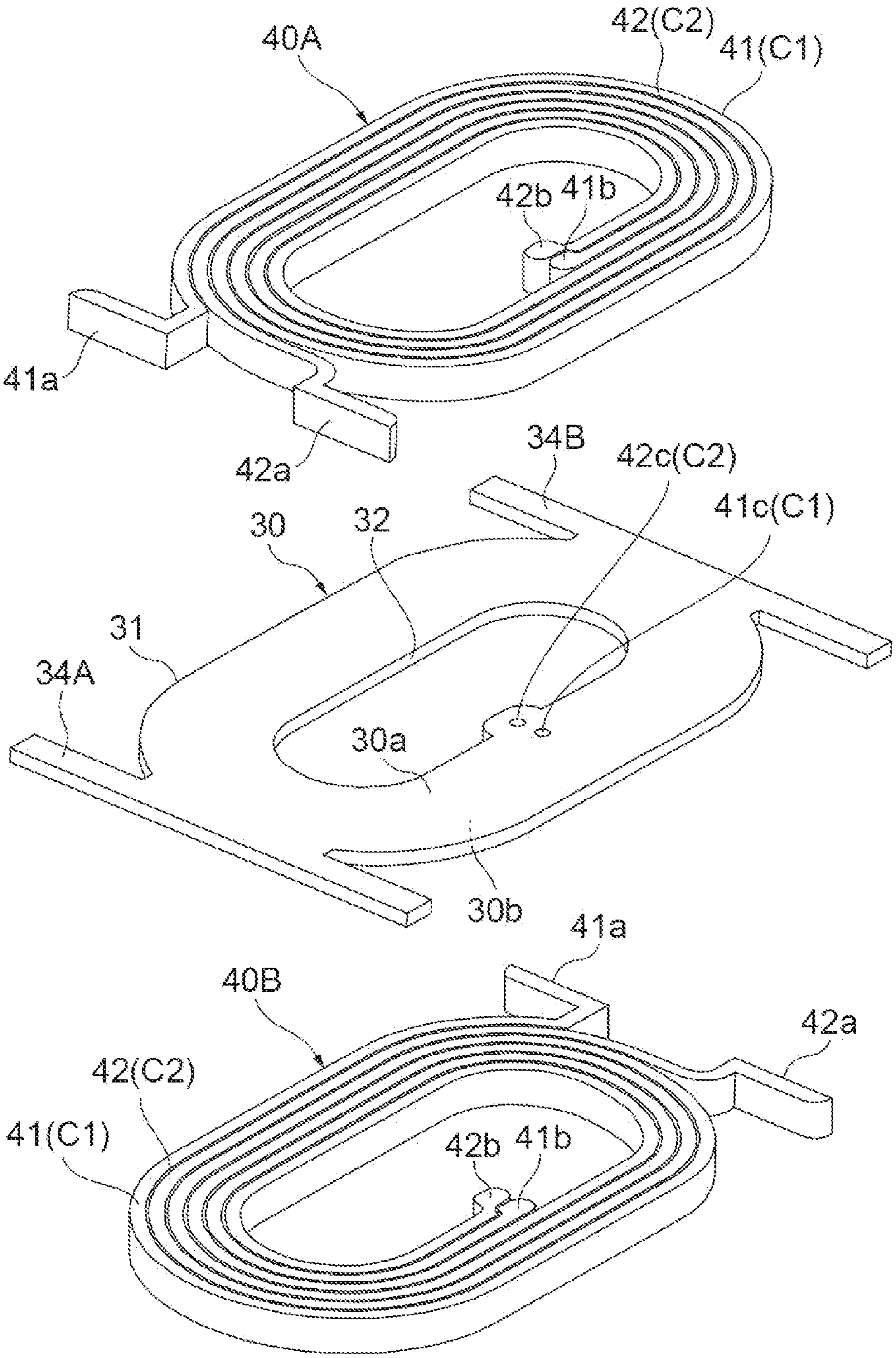
FIG. 3 is an exploded view of the coil shown in FIG. 2.

The insulating substrate 30 has a flat plate shape, extends between the end faces 10*a* and 10*b* of the element body 10, and is designed to be orthogonal to the end faces 10*a* and 10*b*. The insulating substrate 30 extends in parallel to the upper face 10*c* and the lower face 10*d* of the element body 10. As shown in FIG. 3, the insulating substrate 30 includes an elliptical ring-shaped coil forming portion 31 extending along the long-side direction of the element body 10, and a pair of frame portions 34A and 34B extending along the short-side direction of the element body 10 and sandwiching the coil forming portion 31 from both sides. An elliptical opening 32 is provided in a central portion of the coil forming portion 31. The elliptical opening 32 extends along the long-side direction of the element body 10.

The insulating substrate 30 is made of a nonmagnetic insulating material. The thickness of the insulating substrate 30 can be designed in a range of 10 to 60 μm, for example. In the present embodiment, the insulating substrate 30 has a configuration in which glass cloth is impregnated with epoxy resin. The resin constituting the insulating substrate 30 is not limited to the epoxy-based resin and may be a BT resin, polyimide, aramid, or the like. The insulating substrate 30 may be made of ceramic or glass. The constituent material of the insulating substrate 30 may be a mass-produced printed circuit board material. The insulating substrate 30 may be made of a plastic material used for a Bluetooth printed circuit board, a FR4 printed circuit board, or a FR5 printed circuit board.

Figure 2:
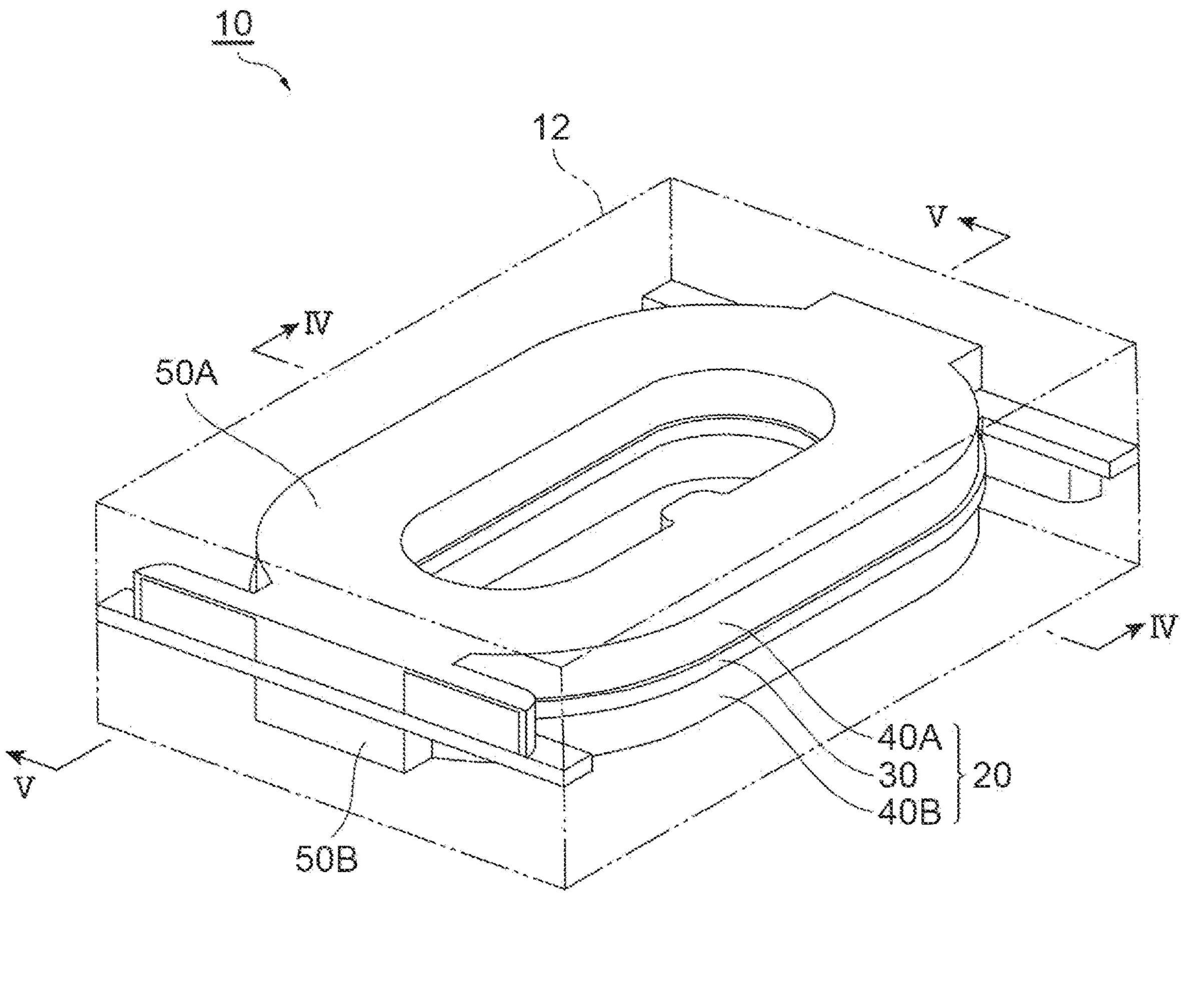
FIG. 2 is a view showing the inside of the coil component of FIG. 1.

The upper coil structure 40A is provided on the substrate upper face 30*a* of the coil forming portion 31 of the insulating substrate 30. As shown in FIGS. 2 and 3, the upper coil structure 40A includes a first planar coil 41, a second planar coil 42, and an upper insulator 50A. The first planar coil 41 and the second planar coil 42 are wound adjacent to each other in parallel on the upper face 30*a* of the insulating substrate 30.

The first planar coil 41 is a substantially elliptical spiral air-core coil wound around the opening 32 of the coil forming portion 31 in the same layer on the upper face 30*a* of the insulating substrate 30. The number of turns of the first planar coil 41 may be one or a plurality of turns. In the present embodiment, the number of turns of the first planar coil 41 is three to four. The first planar coil 41 has an outer end portion 41*a* and an inner end portion 41*b*. The outer end portion 41*a* is provided on the frame portion 34A and is exposed from the end face 10*a* of the element body 10. The inner end portion 41*b* is provided at an edge of the opening 32. The insulating substrate 30 is provided with a first through conductor 41*c* extending in the thickness direction of the insulating substrate 30 at a position overlapping the inner end 41*b* of the first planar coil 41. The first planar coil 41 is made of Cu, for example, and can be formed by electrolytic plating.

Similarly to the first planar coil 41, the second planar coil 42 is a substantially elliptical spiral air-core coil wound around the opening 32 of the coil forming portion 31 in the same layer on the upper face 30*a* of the insulating substrate 30. The second planar coil 42 is wound so as to be adjacent to the first planar coil 41 on the inner peripheral side of the first planar coil 41. The number of turns of the second planar coil 42 may be one or a plurality of turns. In the present embodiment, the number of turns of the second planar coil 42 is the same as the number of turns of the first planar coil 41. The second planar coil 42 has an outer end portion 42*a* and an inner end portion 42*b*. Similarly to the outer end portion 41*a* of the first planar coil 41, the outer end portion 42*a* of the second planar coil 42 is provided in the frame portion 34A and is exposed from the end face 10*a* of the element body 10. The inner end portion 42*b* of the second planar coil 42 is provided at the edge of the opening 32 and is adjacent to the inner end 41*b* of the first planar coil 41. The insulating substrate 30 is provided with a second through conductor 42*c* extending in the thickness direction of the insulating substrate 30 at a position overlapping with the inner end portion 42*b* of the second planar coil 42. Similarly to the first planar coil 41, the second planar coil 42 is made of Cu, for example, and can be formed by electrolytic plating.

Figure 4:
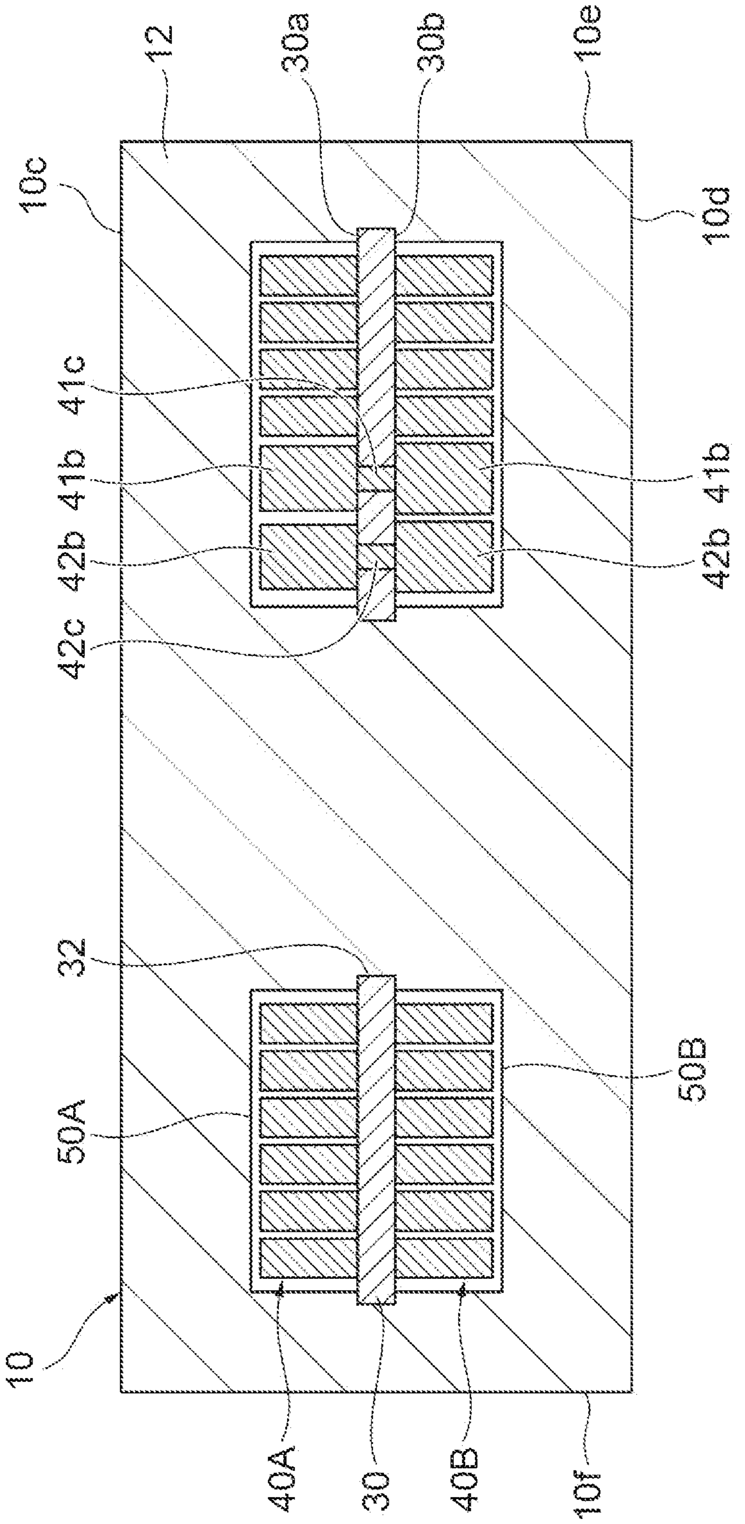
FIG. 4 is a cross-sectional view taken along line IV-IV of the coil component shown in FIG. 2.
Figure 5:
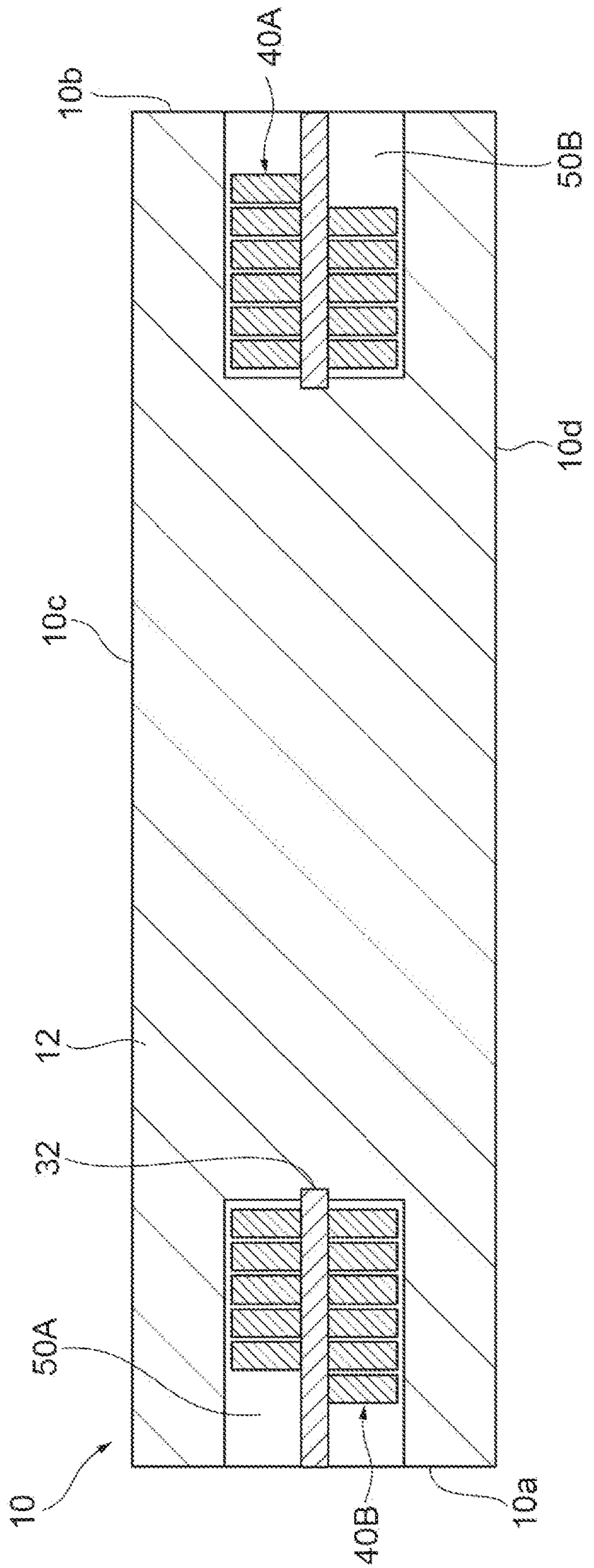
FIG. 5 is a cross-sectional view taken along line V-V of the coil component shown in FIG. 2.
Figure 6:
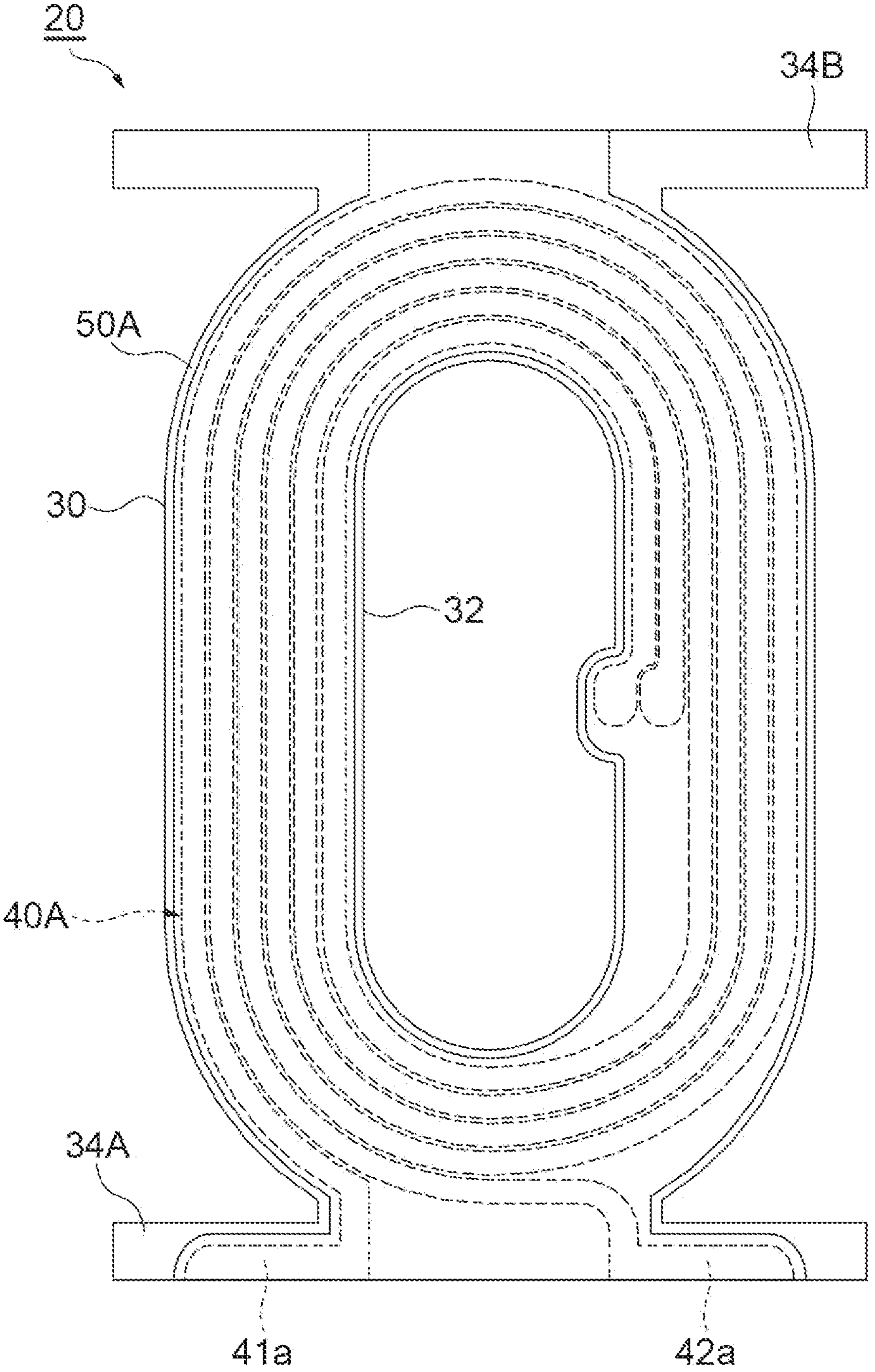
FIG. 6 is a plan view of the coil shown in FIG. 2.

The upper insulator 50A is provided on the upper face 30*a* of the insulating substrate 30 and is a thick-film resist patterned by known photolithography. The upper insulator 50A defines a plating growth region of the first planar coil 41 and the second planar coil 42. In the present embodiment, as shown in FIG. 4, the upper insulator 50A integrally covers the first planar coil 41 and the second planar coil 42, and more specifically, covers side faces and upper faces of the first planar coil 41 and the second planar coil 42. As shown in FIGS. 5 and 6, a portion of the upper insulator 50A extends from the inside of the element body 10 to the end face 10*a* of the element body 10 through between the outer end portion 41*a* and the outer end portion 42*a*, and is exposed at the end face 10*a*. Further, as shown in FIGS. 5 and 6, a part of the upper insulator 50A extends from the inside of the element body 10 to the end face 10*b* along the upper face 30*a* and is exposed at the end face 10*b*. The upper insulator 50A is thicker than the first planar coil 41 and the second planar coil 42. The upper insulator 50A is made of, for example, epoxy.

The lower coil structure 40B is provided on the lower face 30*b* of the coil forming portion 31 of the insulating substrate 30. As shown in FIGS. 2 and 3, the lower coil structure 40B includes a first planar coil 41, a second planar coil 42, and a lower insulator 50B. The first planar coil 41 and the second planar coil 42 are wound in parallel and adjacent to each other on the lower face 30*b* of the insulating substrate 30.

The first planar coil 41 and the second planar coil 42 of the lower coil structure 40B are symmetrical to the first planar coil 41 and the second planar coil 42 of the upper coil structure 40A. Specifically, the first planar coil 41 and the second planar coil 42 of the lower coil structure body 40B have shapes obtained by inverting the first planar coil 41 and the second planar coil 42 of the upper coil structure body 40A around axis parallel to the short sides of the element body 10.

The outer end portion 41*a* of the first planar coil 41 of the lower coil structure 40B is provided in the frame portion 34B and is exposed from the end face 10*b* of the element body 10. The inner end portion 41*b* of the first planar coil 41 of the lower coil structure 40B overlaps the first through conductor 41*c* provided in the insulating substrate 30. Therefore, the inner end portion 41*b* of the first planar coil 41 of the lower coil structure 40B is electrically connected to the inner end portion 41*b* of the first planar coil 41 of the upper coil structure 40A via the first through conductor 41*c*. The first planar coil 41 of the lower coil structure 40B is made of Cu, for example, and can be formed by electrolytic plating.

The outer end portion 42*a* of the second planar coil 42 of the lower coil structure 40B is provided in the frame portion 34B and is exposed from the end face 10*b* of the element body 10. The inner end portion 42*b* of the second planar coil 42 of the lower coil structure 40B overlaps the second through conductor 42*c* provided in the insulating substrate 30. Therefore, the inner end portion 42*b* of the second planar coil 42 of the lower coil structure 40B is electrically connected to the inner end portion 42*b* of the second planar coil 42 of the upper coil structure 40A via the second through conductor 42*c*. The second planar coil 42 of the lower coil structure 40B is made of, for example, Cu, and can be formed by electrolytic plating.

The lower insulator 50B is provided on the lower face 30*b* of the insulating substrate 30 and is a thick-film resist patterned by known photolithography. Similarly to the upper insulator 50A, the lower insulator 50B defines a plating growth region for the first planar coil 41 and the second planar coil 42. In the present embodiment, as shown in FIG. 4, the lower insulator 50B integrally covers the first planar coil 41 and the second planar coil 42, and more specifically, covers side faces and upper faces of the first planar coil 41 and the second planar coil 42. Similarly to the upper insulator 50A, a portion of the lower insulator 50B extends from the inside of the element body 10 to the end face 10*b* of the element body 10 through between the outer end portion 41*a* and the outer end portion 42*a*, and is exposed at the end face 10*b*. A portion of the lower insulator 50B extends along the lower face 30*b* from the inside of the element body 10 to the end face 10*a* and is exposed at the end face 10*a*. The lower insulator 50B is thicker than the first planar coil 41 and the second planar coil 42. The lower insulator 50B may have the same thickness as the upper insulator 50A. The lower insulator 50B is made of, for example, epoxy.

The element body 10 includes a pair of coil portions C1 and C2 constituting a double coil structure. The first coil portion C1 includes the first planar coil 41 of the upper coil structure 40A provided on the upper face 30*a* of the insulating substrate 30, the first planar coil 41 of the lower coil structure 40B provided on the lower face 30*b* of the insulating substrate 30, and the first through conductor 41*c* connecting the first planar coils 41 on both faces. In the first coil portion C1, the outer end portion 41*a* of the first planar coil 41 of the upper coil structure 40A constitutes a first end portion, and an outer end portion 41*a* of the first planar coil 41 of the lower coil structure 40B constitutes a second end portion. The second coil portion C2 is constituted by the second planar coil 42 of the upper coil structure 40A provided on the upper face 30*a* of the insulating substrate 30, the second planar coil 42 of the lower coil structure 40B provided on the lower face 30*b* of the insulating substrate 30, and the second through conductor 42*c* connecting the second planar coils 42 on both faces. In the second coil portion C2, the outer end portion 42*a* of the second planar coil 42 of the upper coil structure 40A constitutes a first end portion, and the outer end portion 42*a* of the second planar coil 42 of the lower coil structure 40B constitutes a second end portion.

The two pairs of external terminal electrodes 60A, 60B, 60C, and 60D are provided so as to cover at least the upper face 10*c* of the element body 10. In the present embodiment, each of the external terminal electrodes 60A, 60B, 60C, and 60D is bent in an L-shape, continuously covers the upper face 10*c* and the end face 10*a* and 10*b*, and is provided in pairs on the end faces 10*a* and 10*b*. The external terminal electrode 60A of the end face 10*a* and the external terminal electrode 60C of the end face 10*b* are provided at positions corresponding to each other in the long-side direction of the element body 10. Similarly, the external terminal electrode 60B on the end face 10*a* and the external terminal electrode 60D on the end face 10*b* are provided at positions corresponding to each other in the long-side direction of the element body 10.

In the present embodiment, the external terminal electrodes 60A, 60B, 60C, and 60D are made of resinous electrodes, for example, made of resins containing Ag powder. Each of the external terminal electrodes 60A, 60B, 60C, and 60D can be formed by applying an electrode paste, for example. In this case, the electrode paste can be transferred to the element body 10 by using a rib or a roller of the mold. Further, the electrode paste can be printed on the element body 10 by screen printing.

Figure 7:
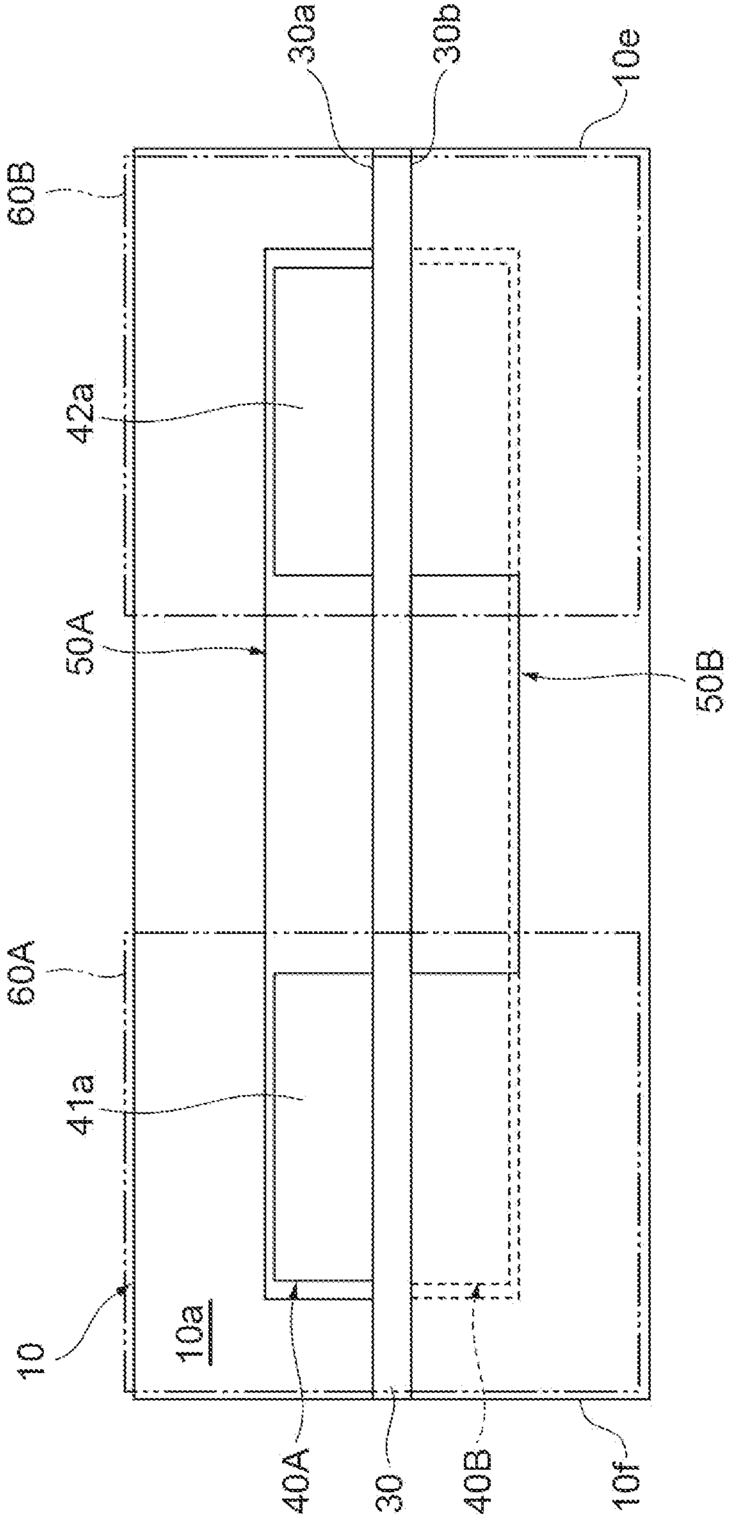
FIG. 7 is a view showing one end face of the element body of the coil component shown in FIG. 1.

Of the pair of external terminal electrodes 60A and 60B (first external terminals) provided on the end face 10*a*, the external terminal electrode 60A is connected to the outer end portion 41*a* of the first planar coil 41 of the upper coil structure 40A, and the external terminal electrode 60B is connected to the outer end portion 42*a* of the second planar coil 42 of the upper coil structure 40A. As shown in FIG. 7, when viewed from the end face 10*a* side, the external terminal electrode 60A is biased toward the side face 10*f* side and covers the end face 10*a* up to near the edge of the side face 10*f*. The external terminal electrode 60B is biased to the side face 10*e* side, and covers the end face 10*a* up to near the edge of the side face 10*e*. When viewed from the end face 10*a* side, the external terminal electrode 60A and the external terminal electrode 60B are separated by a predetermined uniform width.

Figure 8:
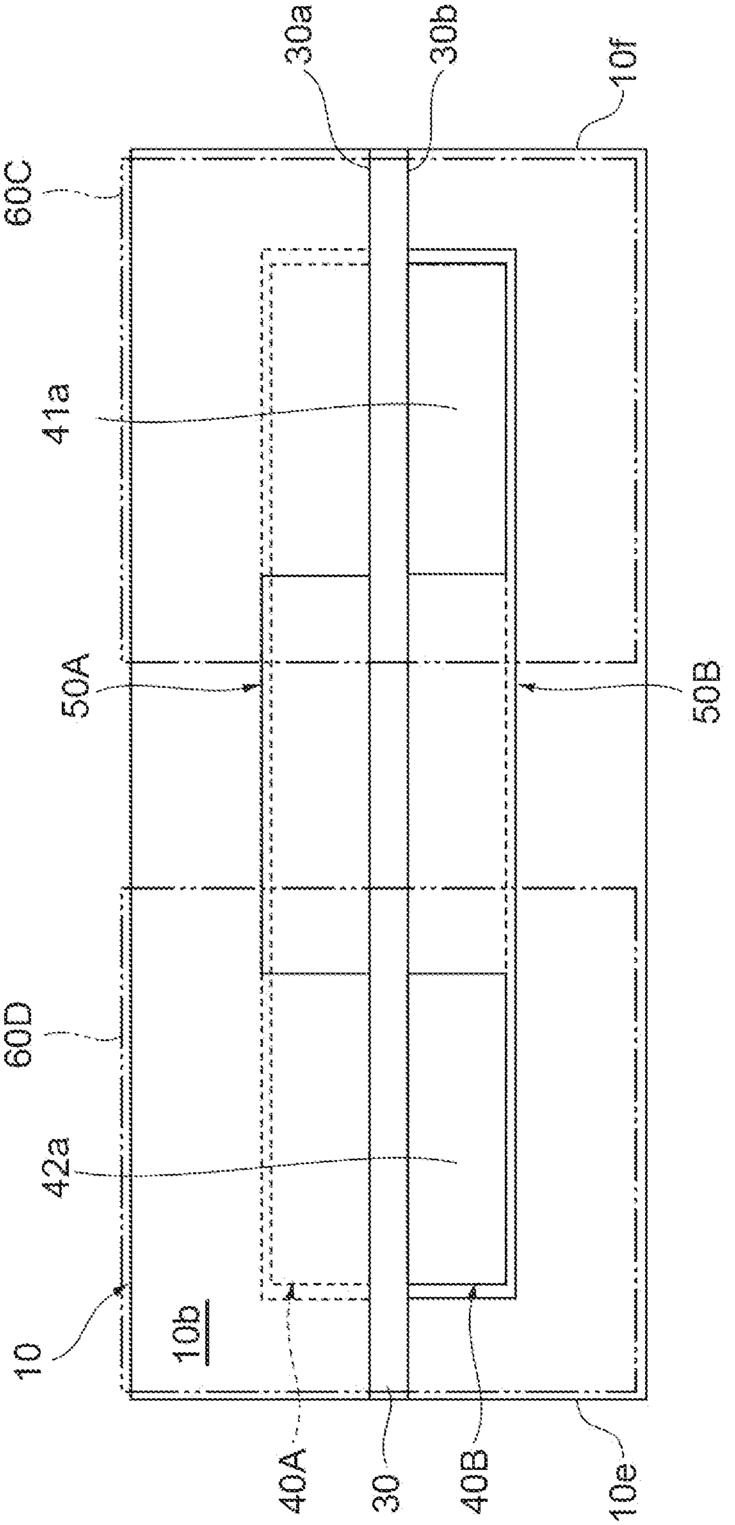
FIG. 8 is a view showing the other end face of the element body of the coil component shown in FIG. 1.

Of the pair of external terminal electrodes 60C and 60D (second external terminals) provided on the end face 10*b*, the external terminal electrode 60C is connected to the outer end portion 41*a* of the first planar coil 41 of the lower coil structure 40B, and the external terminal electrode 60D is connected to the outer end portion 42*a* of the second planar coil 42 of the lower coil structure 40B. As shown in FIG. 8, when viewed from the end face 10*b* side, the external terminal electrode 60C is biased toward the side face 10*f* side and covers the end face 10*b* up to near the edge of the side face 10*f*. The external terminal electrode 60D is biased to the side face 10*e* side, and covers the end face 10*b* up to near the edge of the side face 10*e*. When viewed from the end face 10*b* side, the external terminal electrode 60C and the external terminal electrode 60D are separated by a predetermined uniform width.

On the end face 10*a* of the element body 10, as shown in FIG. 7, the outer end portion 41*a* of the first planar coil 41 and the outer end portion 42*a* of the second planar coil 42 are arranged on the upper face 30*a* of the insulating substrate 30. The upper insulator 50A is located in a region between the outer end portion 41*a* of the first planar coil 41 and the outer end portion 42*a* of the second planar coil 42 on the end face 10*a* of the element body 10. The lower insulator 50B is located on the end face 10*a* of the element body 10 so as to face the upper insulator 50A with the insulating substrate 30 interposed therebetween. Similarly, in the end face 10*b* of the element body 10, as shown in FIG. 8, the lower insulator 41*a* exposed to the end face 10*b* is located in a region between the outer end portion 41*a* of the first planar coil 41 and the outer end portion 42*a* of the second planar coil 42. The upper insulator 50A is located on the end face 10*b* of the element body 10 so as to face the lower insulator 50B with the insulating substrate 30 interposed therebetween.

Next, the shapes of the external terminal electrodes 60A, 60B, 60C, and 60D on the upper face 10*c* of the element body 10 will be described with reference to FIG. 9.

Figure 9:
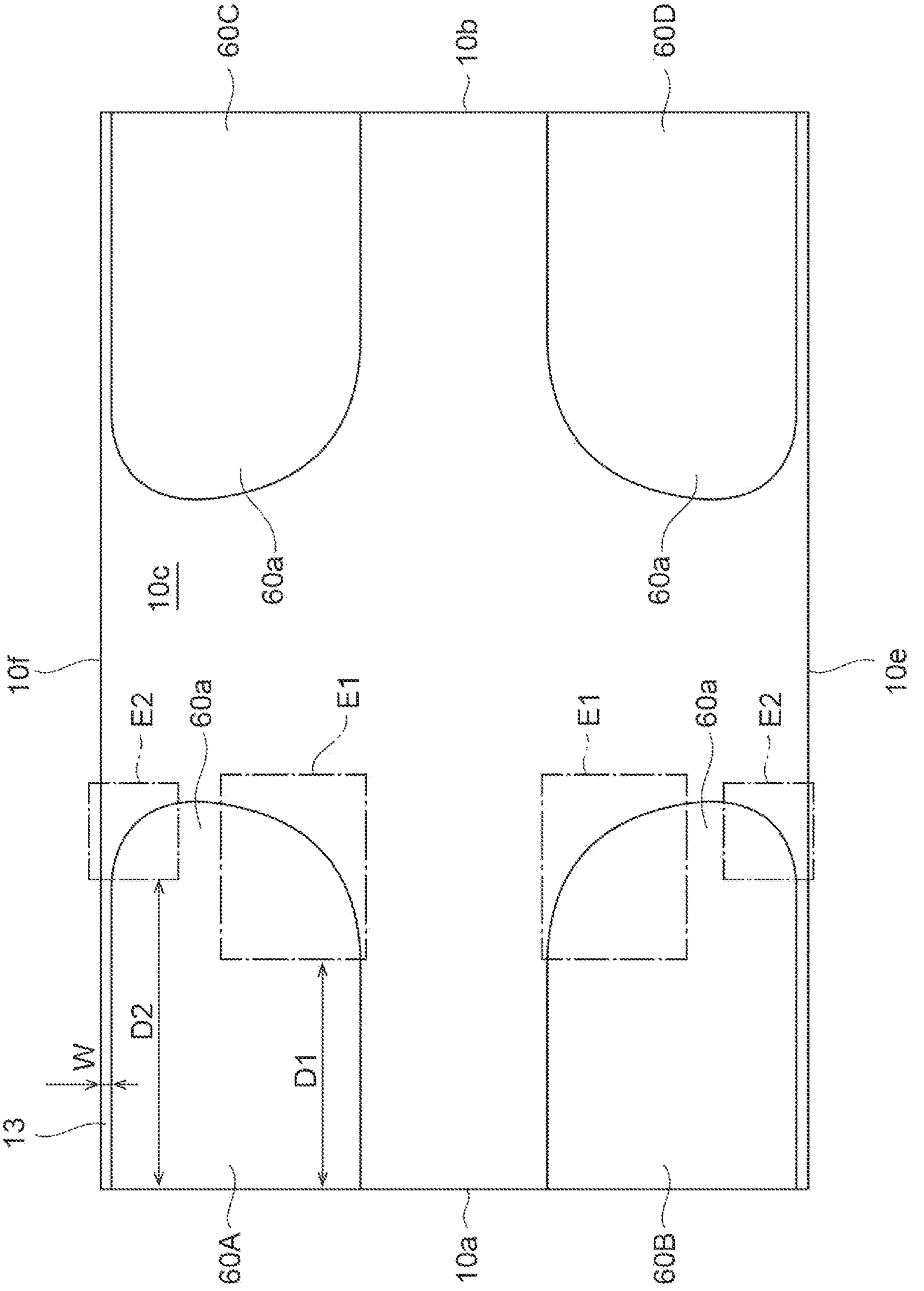
FIG. 9 is a view showing the shape of the external terminal on the upper face of the element body.

As shown in FIG. 9, the external terminal electrodes 60A, 60B, 60C, and 60D are located at the four corners of the rectangular upper face 10*c*. Each of the external terminal electrodes 60A, 60B, 60C, and 60D has a substantially U-shaped outline when viewed from the upper face 10*c* side. In the upper face 10*c*, the external terminal electrodes 60A, 60B, 60C, and 60D extend inward from the edges corresponding to the end faces 10*a* and 10*b*. In the present embodiment, each of the external terminal electrodes 60A, 60B, 60C, and 60D is apart from the outer edge of the upper face 10*c* by a predetermined distance in a direction facing the pair of side faces 10*e* and 10*f* on the upper face 10*c*, and an exposed region 13 is formed between the outer edge of the upper face 10*c* and each of the external terminal electrodes 60A 60B 60C and 60D. In the exposed region 13, the upper face 10*c* is exposed from each of the external terminal electrodes 60A, 60B, 60C, and 60D.

Inner end portions 60*a* of each of the external terminal electrodes 60A, 60B, 60C, and 60D on the upper face 10*c* of the element body 10 have no corner, and each of the inner end portions 60*a* is configured by curve. In the present embodiment, each of the inner end portions 60*a* of the external terminal electrodes 60A, 60B, 60C, and 60D has a first curved portion E1 and a second curved portion E2. In the external terminal electrodes 60A and 60B extending inward from the edges corresponding to the same end face 10*a*, the first curved portion E1 is located on a side close to each other, and the second curved portion E2 is located on a side far from each other. Similarly, in the external terminal electrodes 60C and 60D extending inward from the edges corresponding to the same end face 10*b*, the first curved portion E1 is located on a side close to each other, and the second curved portion E2 is located on a side far from each other. In the present embodiment, the first curved portion E1 is designed to have a smaller curvature than the second curved portion E2. Further, in the present embodiment, the lengths D1 of straight lines extending from the edges corresponding to the end faces 10*a* and 10*b* to the first curved portion E1 are designed to be shorter than the lengths of straight lines extending from the edges corresponding to the end faces 10*a* and 10*b* to the second curved portion E2.

As described above, in the coil component 1, since each of the external terminal electrodes 60A, 60B, 60C, and 60D on the upper face 10*c* has a U-shaped outline, stress concentration is less likely to occur in the inner end portion 60*a* than in an external terminal electrode having a corner at the inner end portion. Therefore, for example, even when an impact is applied to the coil component 1, a situation in which the external terminal electrodes 60A, 60B, 60C, and 60D are peeled off from the upper face 10*c* due to stress concentration is prevented. In addition, occurrence of cracks in the external terminal electrodes 60A, 60B, 60C, and 60D, or the element body 10 due to stress concentration is also prevented.

In addition, in the coil component 1, each of the external terminal electrodes 60A, 60B, 60C, and 60D covers only two faces (that is, the upper face and the end face), and does not cover the corners of the element body 10 defined by the upper face 10*c*, the end face 10*a*, 10*b*, and the side faces 10*e* and 10*f*. Even if the external terminal electrodes 60A, 60B, 60C, and 60D covers only two faces as described above, each of the external terminal electrodes 60A, 60B, 60C, and 60D has a U-shaped outline in the upper face 10*c*, and thus is less likely to be peeled off from the upper face 10*c*.

It should be noted that the present disclosure is not limited to the above-described embodiment and can be variously modified.

For example, the electronic component is not limited to the coil component and may be another electronic component (for example, a capacitor, a resistor, a varistor, or the like). The number of external terminal electrodes can be increased or decreased as appropriate, and one or three or more external terminal electrodes may be provided on the end face.

What is claimed is:

1. An electronic component comprising:

an element body having a pair of end faces parallel to each other and a mounting face connecting the pair of end faces; and a pair of first external terminals covering at least a mounting face of surface of the element body and connecting electrically to an internal conductor provided in the element body, wherein when viewed from the mounting face side, the pair of first external terminals extend inward from an edge corresponding to the end face, and have a U-shaped outline with an inner end portion curved, and wherein the inner end portion of each of the pair of first external terminals has a first curved portion on a side close to each other and a second curved portion on a side far from each other, and a curvature of the first curved portion is smaller than a curvature of the second curved portion.

2. The electronic component according to claim 1, wherein the pair of first external terminals continuously covers the mounting face and the end face of the element body.

3. The electronic component according to claim 1, wherein, in the outline of the pair of first external terminals, a length of a straight line extending from the edge corresponding to the end face to the first curved portion is shorter than a length of a straight line extending from the edge corresponding to the end face to the second curved portion.

4. The electronic component according to claim 1 comprising the pair of first external terminals extending inward from one of the pair of end faces and a pair of second external terminals extending inward from the other of the pair of end faces, wherein the inner end portion of each of the pair of second external terminals has a first curved portion on a side close to each other and a second curved portion on a side far from each other, and a curvature of the first curved portion is smaller than a curvature of the second curved portion.

5. The electronic component according to claim 4, wherein the mounting face of the element body has a rectangular shape, and wherein the pair of first external terminals and the pair of second external terminals are respectively located at four corners of the mounting face.

6. The electronic component according to claim 1, wherein the element body includes metal powder and resin.

7. The electronic component according to claim 1, the element body has a pair of side faces orthogonal to the pair of end faces, and wherein an exposed region is formed between an outer edge of the mounting face and the first external terminal in a direction facing the pair of side faces on the mounting face, the mounting face is exposed from the first external terminal the exposed region.

* * * * *